Nov. 9, 1965   H. M. SCISLOWICZ   3,216,419
APPARATUS FOR ADMINISTERING A PARENTERAL SOLUTION PROVIDED
WITH A DIAPHRAGM FLOAT VALVE
Filed Oct. 17, 1963   6 Sheets-Sheet 3
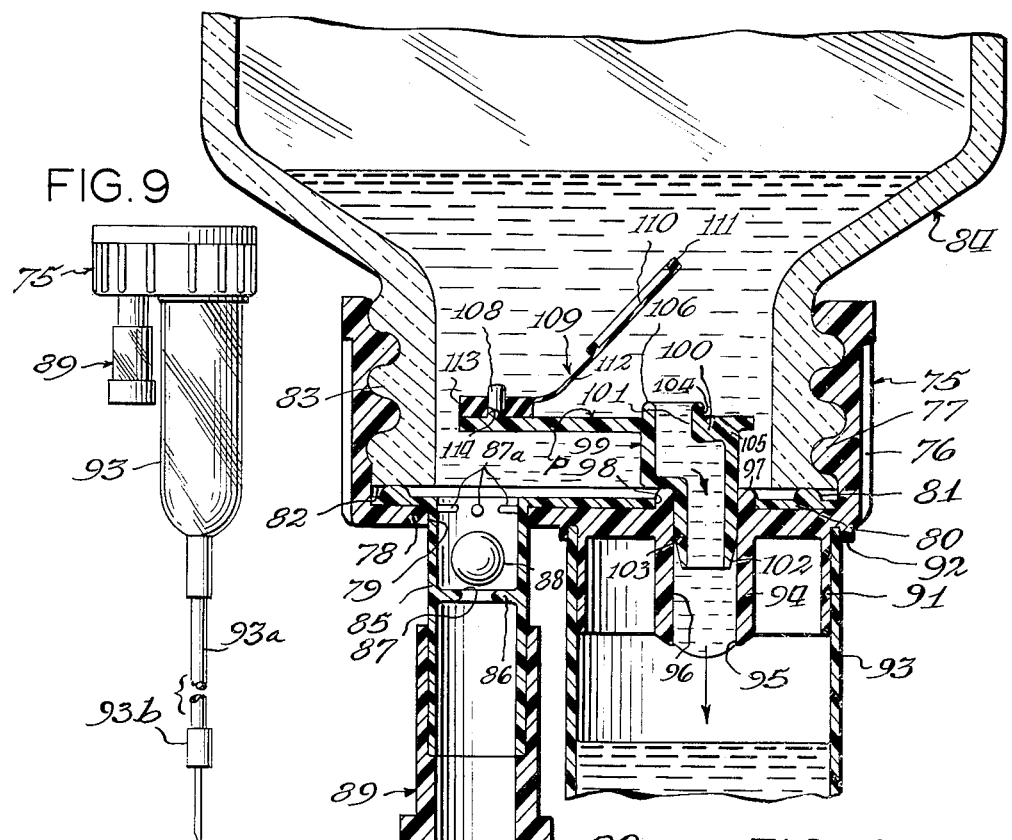
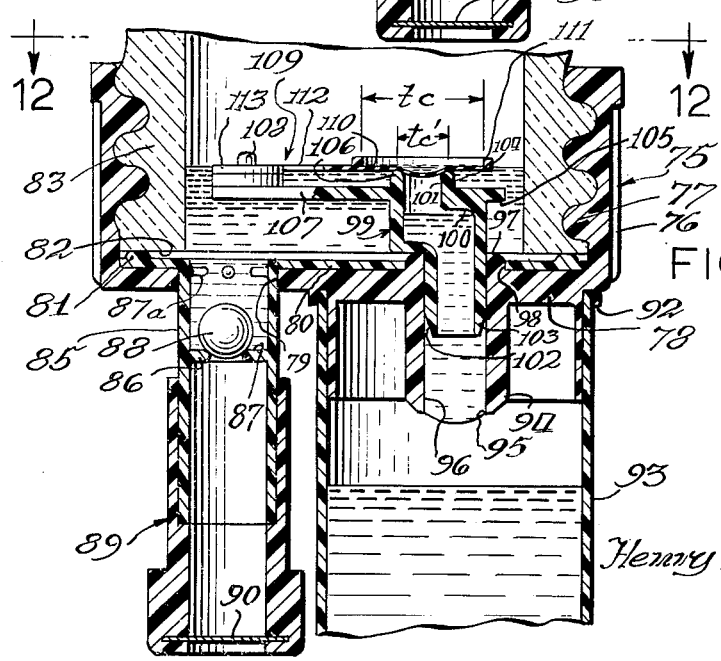
Inventor
Henry M. Scislowicz

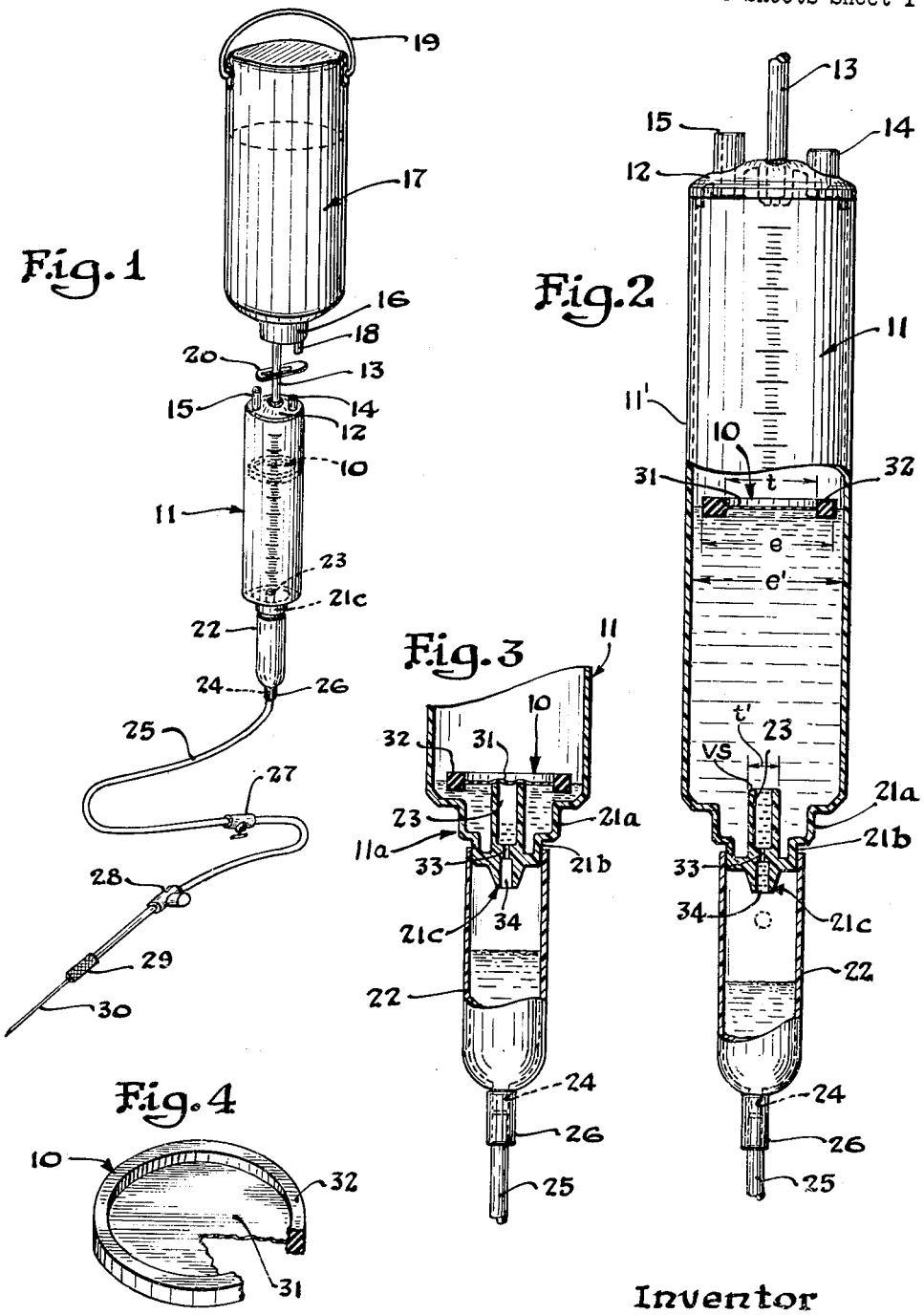

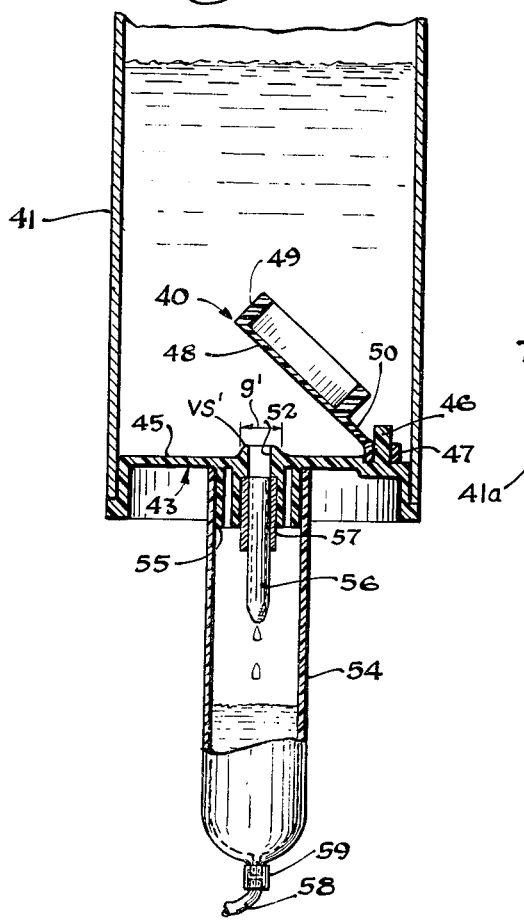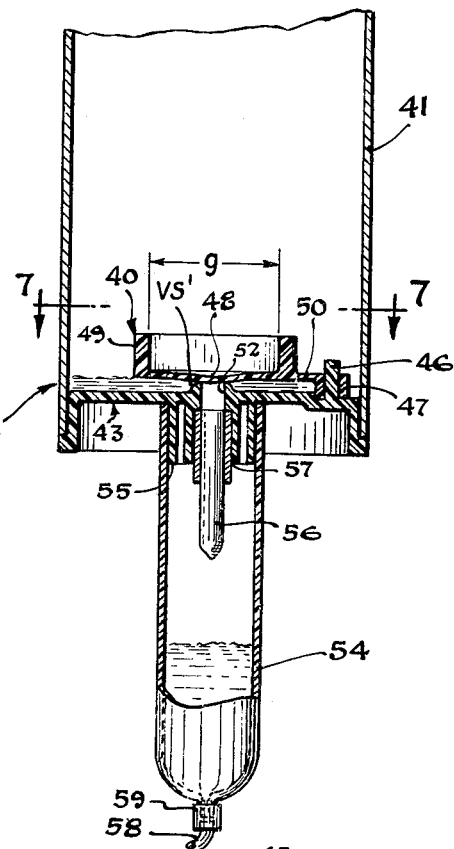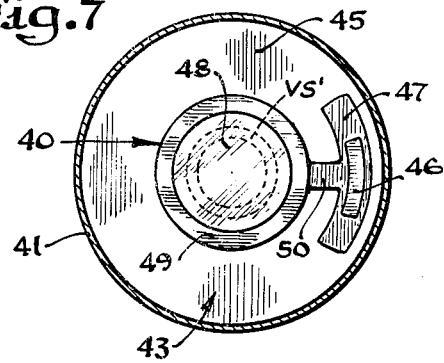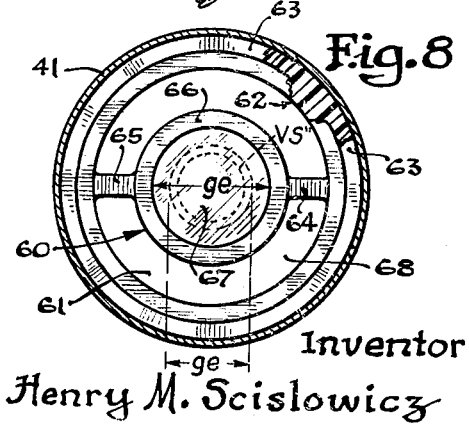

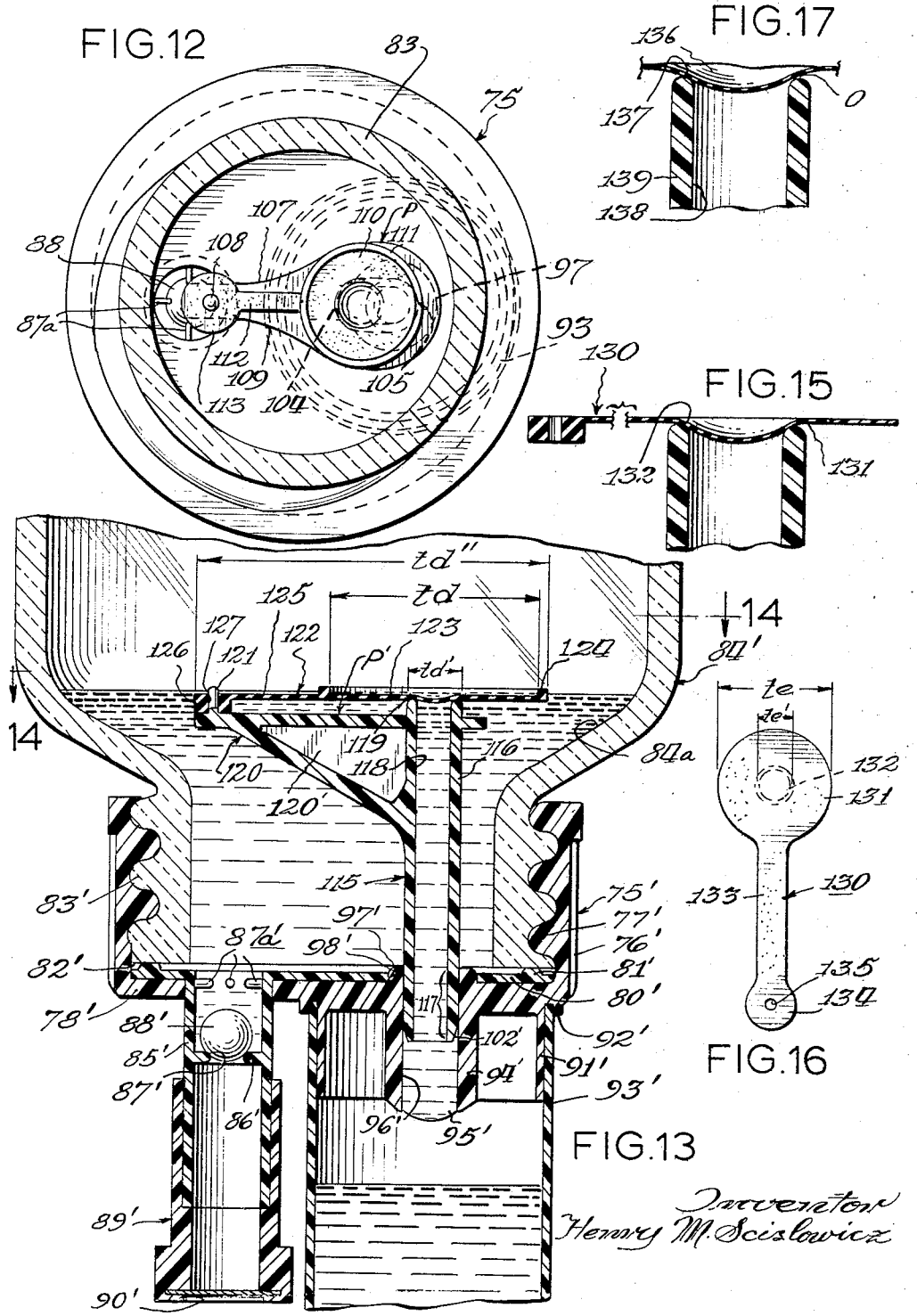

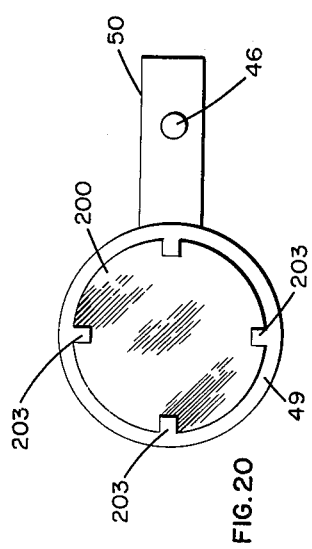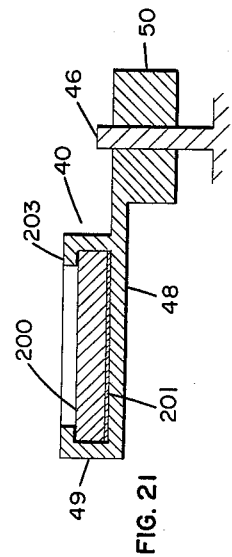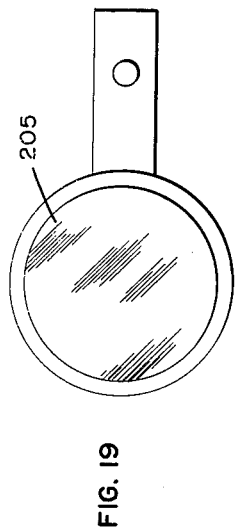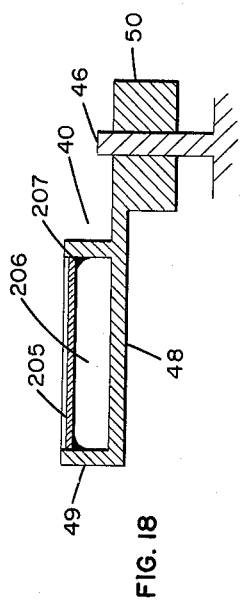

United States Patent Office 3,216,419
Patented Nov. 9, 1965

3,216,419
APPARATUS FOR ADMINISTERING A PARENTERAL SOLUTION PROVIDED WITH A DIAPHRAGM FLOAT VALVE
Henry M. Scislowicz, Lake Bluff, Ill., assignor to Abbott Laboratories, North Chicago, Ill., a corporation of Illinois
Filed Oct. 17, 1963, Ser. No. 316,953
7 Claims. (Cl. 128—214)

This application is a continuation-in-part of application Serial No. 264,909, now abandoned, filed March 13, 1963, which application is itself a continuation-in-part of application Serial No. 111,421, now abandoned, filed May 15, 1961, the latter application being a continuation-in-part of application Serial No. 787,652, now abandoned, filed January 19, 1959.

This invention relates to an apparatus for the administration of a parenteral solution and more particularly to an apparatus having an improved means for automatically stopping its operation after a predetermined amount of parenteral solution has been administered.

In the administration of parenteral solutions, it is common practice to administer to a patient, particularly young children, a predetermined amount of parenteral solution. In pediatrics the predetermined amount of solution administered is often quite critical. It is common practice in the administration of parenteral solution in a pediatric case to fill a metering container, which is integrally connected as part of an administration apparatus, with a predetermined amount of parenteral solution. The solution is normally carried to the patient by means of tubing and a hypodermic needle while the latter is inserted into the vein of the patient.

It is an object of the invention to provide a float having a very thin, flexible diaphragm which is employed to close off or seal off low in an apparatus for administering a parenteral solution. The very thin, flexible diaphragm is such that it at least partially conforms to a valve seat. The very thin, flexible diaphragm is of such a character, however, that it has sufficient form retainability so that an effective continuous seal is able to be established between the diaphragm and the valve seat.

It is an object of the invention to provide a very thin, flexible diaphragm which is hingedly mounted for sealing off flow in an apparatus for administering a parenteral solution, with the very thin, flexible diaphragm being hingedly mounted by a flexible hinge which is suitably anchored at one end.

It is an object of the invention to provide in a parenteral administration apparatus, a platform or baffle which serves the function of supporting an edge of a float which is canted with respect to the horizontal when the float is about to seat against a valve seat and which at the same time serves the function of preventing air from passing substantially directly from the air vent through the outlet passage and consequently into the patient.

It is another object of the present invention to provide an improved apparatus which will administer a parenteral solution conveniently and without danger of causing air embolism in the patient.

It is still another object of the present invention to provide a float for an improved apparatus which is inexpensive and of simple construction, yet reliable in use.

A concomitant object of the present invention is to provide a floating valve seat having means secured thereto for increasing the buoyancy of the valve set.

The foregoing objects and other objects of the present invention will be readily appreciated by reference to the following detailed description when considered in conjunction with the accompanying diagrammatic, illustrative drawings showing several embodiments of this invention wherein:

FIGURE 1 is a perspective, schematic view of one embodiment of the invention in operative arrangement with the associated administration apparatus;

FIGURE 2 is a side elevational view, partially in vertical section, of a metering container of FIGURE 1 with a drip chamber attached and showing a float riding on the surface of the solution in the metering container;

FIGURE 3 is a fragmentary, side elevational view, similar to FIGURE 2, showing the float in the closed off position;

FIGURE 4 is a perspective partially cutaway view of the float shown in FIGURES 1 through 3;

FIGURE 5 is a fragmentary side elevational view showing another embodiment of the float of the invention, with the float shown in the open position;

FIGURE 6 is a view like FIGURE 5, but illustrating the float in the closed position;

FIGURE 7 is a cross-sectional view taken along line 7—7 of FIGURE 6;

FIGURE 8 is a cross-sectional view like FIGURE 7 illustrating still another embodiment of the float of the present invention;

FIGURE 9 is a side elevational view of a connector cap and a drip chamber with which a valve assembly of the invention is employable;

FIGURE 10 is a fragmentary cross-sectional view of the connector cap, the drip chamber, a container and a valve assembly employing a float having a very thin, flexible diaphragm, with the float shown submerged in the solution and out of contact with a valve seat;

FIGURE 11 is a fragmentary cross-sectional view similar to FIGURE 10 but showing the float in a position for sealing off flow;

FIGURE 12 is a cross-sectional view taken along line 12—12 of FIGURE 11;

FIGURE 13 is a cross-sectional view of another embodiment of the apparatus of the invention showing the float to be in a position for sealing off flow;

FIGURE 15 is a cross-sectional view showing a float having a very thin, flexible diaphragm without a form retaining member and showing a valve seat;

FIGURE 16 is a top plan view on a reduced scale of the float and valve seat shown in FIGURE 15;

FIGURE 17 is a fragmentary cross-sectional view of a float illustrating a very thin, flexible diaphragm without a form retaining member and without sufficient form retainability to enable an effective continuous seal to be established between the diaphragm and the valve seat;

FIGURE 18 is a cross-sectional view of a further modification of this invention, shown applied to the embodiment of FIGURES 5 through 8;

FIGURE 19 is a top plan view of the modification of FIGURE 18;

FIGURE 20 is a cross-sectional view of an additional modification of this invention; and FIGURE 21 is a top plan view of the modification of FIGURE 20.

Figure 14:
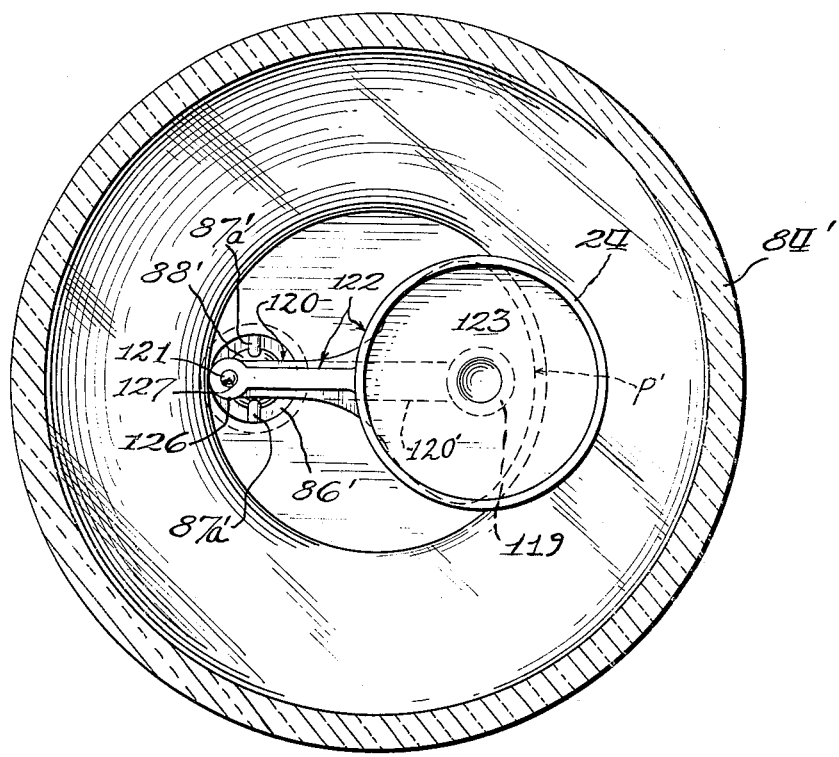
FIGURE 14 is a cross-sectional view taken along line 14—14 of FIGURE 13.

In one embodiment of the invention illustrated in FIGURES 1 through 4 of the illustrative drawings, a one-piece float 10 is freely and floatably enclosed in a chamber such as plastic, metering container 11 having a generally cylindrical side wall 11′, a lower end 11a and an upper end wall defined by a cap member 12 which is preferably composed of a rigid plastic material. A flexible inlet tube 13 is securely fastened in the cap member 12 and forms a passageway into the interior of the metering container 11. Also extending through the cap member 12 and communicating with the interior of the container 11 are a tubular air vent 14 and a tubular secondary site 15. The inlet tube 13 is also preferably secured at its other end to a connector 16 which is threadably engaged onto a conventional liquid container 17 equipped with an air vent 18. The liquid container 17 is suspended at its upper end by a bail assembly 19. Mounted on the inlet tube 13 approximately midway between the liquid container 17 and the metering container 11 is a tubing clamp 20 adapted to cut off the flow of solution through the inlet tube 13.

The metering container 11 has at its lower end 11a a pair of reducing tubular portions 21a, 21b and a small diameter axial drop former 21c. A drip chamber 22 is sealably mounted on the reducing tubular portion 21b and communicates with the metering container 11 through the outlet passage 23. The upper end of the outlet passage 23 defines a valve seat VS which is shown to be upstanding. Disposed at the lower end 11a of the drip chamber 22 is a reduced diameter section 24 to which is sealably connected a length of plastic tubing 25 by means of a connector 26. Mounted on the tubing 25 is a tubing clamp 27 and a Y-shaped penetrable reseal connector 28 into which a hypodermic needle can be inserted. The lower end of the plastic tubing 25 has a hypodermic needle 30 mounted thereon by means of its needle hub 29.

As best illustrated in FIGURES 3 and 4 of the illustrative drawings, the float 10 is composed of a very thin, flexible diaphragm 31 sealed at the peripheral edge thereof to an annular form retaining member 32. The diaphragm 31 is shown to have a greater effective transverse extent $t$ than the transverse extent $t'$ of the valve seat VS, while the form retaining member 32 is shown to have a slightly lesser transverse extent $e$ than the inside transverse extent $e'$ of the metering container 11. As best shown in FIGURE 2 the float 10 rides the upper surface of the solution in the metering container 11 during administration. The solution in the metering container 11 flows through the tubular outlet passage 23, downwardly through the small diameter annular outlet passage portions 33 and 34 which serve as a drop former 21c of the tubular outlet passage 23. As the solution passes through the passage portions 33 and 34, the level of the solution in the metering container 11 falls, as does the float 10 riding on the surface thereof. When the liquid level reaches the uppermost part of tubular outlet passage 23, the diaphragm 31 is pulled or sucked partially into the tubular outlet passage 23, thereby at least partially conforming to the valve seat VS and sealing off and preventing the passage of both liquid and air downwardly therethrough. It will be seen that the upper end of the tubular outlet passage 23 forms the valve seat VS for the diaphragm 31. Formed integrally with the side wall 11' is a platform 32a which is defined by a continuous annular inwardly extending shoulder. The platform 32a is disposed slightly below the level of the valve seat VS. In the event the container 11 becomes canted with respect to the vertical, a side edge 32' of the form retaining member 32 will be supported by the platform 32a as the diaphragm 31 is about to seat against the valve seat VS.

FIGURES 5, 6 and 7 of the illustrative drawings illustrate a one-piece float generally indicated at 40, enclosed in a plastic metering container 41 having a lower end 41a, which is shown in FIGURE 5 to be submerged in the parenteral solution. A closure member 43, composed of a rigid plastic material, is in fluid-tight engagement with metering container 41. The closure member 43 forms a lower end wall or platform 45. A post 46 formed integrally with the closure member 43 anchors an arc-like retaining member 47 of the float 40. The float 40 is comprised of a very thin, flexible diaphragm 48 joining at the marginal edge of the form retaining member 49. The diaphragm 48 is shown to have a greater effective extent $ta$ than the transverse lower extent $ta'$ of a valve seat VS'. A thin, flexible rubber hinge member 50 joins the marginal edge of the diaphragm 48 and the retaining member 47. With the metering container 41 filled with solution, the diaphragm 48 and the form retaining member 49 are prevented from riding the surface of the solution by the retaining and hinge members 47 and 50, respectively.

The closure member 43 has a tubular outlet passage 52 with the valve seat VS', which is shown to be upstanding and which is disposed at the upper end of the outlet passage 52. Since the platform 45 is disposed only slightly below the valve seat VS', the platform 45 serves to support a side edge 49' of the form retaining member 49 in the event the diaphragm 48 with its form retaining member becomes canted as the diaphragm is about to seat against the valve seat VS'. A flexible, resilient plastic drip chamber 54 is secured to a depending skirt-like tubular projection 55 of the closure member 43 at the opposite end of the tubular outlet passage 52. A metal or plastic drop former 56 is housed in the tubular outlet passage 52 by means of a compartment 57. Communicating in fluid-tight engagement with flexible drip chamber 54 is a length of plastic tubing 58 by means of a connector 59.

During administration of the liquid from the metering container 41, the float 40 will assume the position shown in FIGURE 5 with the diaphragm 48 disposed a short distance above the valve seat VS' of the tubular outlet passage 52. When the liquid level approaches the uppermost end of the valve seat VS', diaphragm 48 is pulled or sucked partially into the tubular outlet passage 52, thereby at least partially conforming to the valve seat VS' and sealing off and preventing the passage of either liquid or air into drip chamber 54 as best illustrated in FIGURE 6.

FIGURES 18, 19, 20 and 21 illustrate further modifications of the invention applied to the embodiment of FIGURES 5 through 8 inclusive. In FIGURES 18 and 19 a polyethylene disc 205 is peripherally sealed to the inner wall of retaining member 49 by heat seals 207. The disc 205 is spaced from diaphragm 48 to provide a closed air cell 206 therebetween which serves to substantially increase the buoyancy of the valve. In FIGURE 20, float member 40 has a disc-shaped member 200 seated on the top of diaphragm 48 within the confines of retaining member 49. The disc-shaped member 200 is composed of polyurethane foam, polyethylene foam or any other highly buoyant material and is shown adhered to the upper face of diaphragm 48 by a suitable adhesive 201. The adhesive serves to prevent the disc-shaped insert 200 from separating from the float member 40. Alternatively, retaining member 49 may have integral lips 203 to overlie the disc 200 and secure the same in position. Other suitable fastening means may be utilized, or disc-shaped member 200 may be of such a shape as to be held in frictional engagement with the inner wall of retaining member 49. This buoyant member serves to increase the buoyancy of the entire float valve 40 and to insure that the valve will float when there is fluid in container 41 above the level of valve set 52. This is often necessary because the buoyancy of the float valve 40 per se, is inadequate to fully clear the valve opening and freely permit flow therethrough.

These modifications may be utilized with any of the float valves described in this application in like manner as illustrated and described in connection with the embodiment of FIGURES 5 through 8 inclusive.

As shown in the embodiment of FIGURE 8 of the illustrative drawings, an alternative form of one-piece float 60 is adapted to move vertically for a small limited distance within the confines of the metering container 41. An annular retaining member 62 is accommodated within an upstanding annular skirt portion 63. Two oppositely disposed thin rubber hinge members 64 and 65 are shown to interconnect the retaining member 62 and a very thin, flexible diaphragm 67.

The diaphragm 67 is shown to have a greater effective transverse extent $tb$ than the transverse extent $tb'$ of a valve seat VS''. The retaining member 62 is shown to be anchored at the lateral edges of the skirt portion 63 and at the base of a floor 68 by means of gluing or the like. Float 60 has a form retaining member 66.

To administer parenteral solutions to a patient by means of the apparatus of the embodiment of FIGURES 1 through 4 of the illustrative drawings, the liquid container 17 containing the desired parenteral solution is firmly screwed onto the connector 16. The liquid container 17 is then suspended from an appropriate supporting means (not shown) by the bail assembly 19. When the liquid container 17 is in an elevated position, the tubing clamp 27 is closed and the tubing clamp 20 is opened, causing the solution in the liquid container 17 to flow through the inlet tube 13 into the metering container 11. A steady flow of solution from the liquid container 17 into the metering container 11 is made possible by providing the air vent 18 disposed in the connector 16 allowing air to enter the liquid container 17 and the air vent 14 in the cap member 12 which permits the air to escape from or enter the container 11 as required. The solution is allowed to flow into the metering container 11 until the desired amount of solution to be administered is contained therein, and then the tubing clamp 20 is moved to closed position to stop further flow. The float 10 is now riding on the upper surface of the solution and the needle 30 is inserted into the vein of the patient after all air has been cleared therefrom. With the needle 30 in place, the tubing clamp 27 is now opened and the solution is administered dropwise to the patient. If additional medication is desired to be administered in the solution, it can be done by inserting a hypodermic needle (not shown) through the tubular secondary site 15. If additional medication is desired without having it placed in the parenteral solution, it can be administered by a hypodermic needle through the Y-shaped penetrable reseal connector 28.

As the level of liquid drops in the metering container 11, the float 10 correspondingly drops and when the level reaches the upper end of the tubular outlet passage 23, that is, the valve seat VS, the thin, flexible diaphragm 31 of the float 10 is pulled slightly into the open end of the tubular outlet passage 23 by means of the downward spiral created when the liquid passes outwardly therethrough. The diaphragm 31 is held securely against the valve seat VS defined by the upper end of the tubular outlet passage 23 by means of a vacuum created by the gravitational pull of the liquid brought about through the head height. The secure seating or lodging of the diaphragm 31 against the valve seat VS serves as a valve closure through which neither air nor liquid can pass, and it does so automatically without attendance by anyone.

With the desired amount of solution administered, the needle 30 is withdrawn from the patient or if additional medication is desired, the tubing clamp 27 is closed, an amount of solution sufficient to cover the float 10 is allowed to flow into the metering container 11 and the wall of the flexible drip chamber 22 are firmly pressed together imparting an upward force to the diaphragm 31, thereby unsealing and freeing it from the valve seat VS. With the float 10 free in the metering container 11, the previously described filling and administration operation can be repeated.

The metering container 41, like the metering container 11, operates in conjunction with the administration apparatus of FIGURE 1. The cap member 12 with the inlet tube 13 and the liquid container 17 is attached to the end of the metering container 41 opposite the closure member 43. The flexible tubing 58, like the tubing 25, has a hypodermic needle as well as a clamp attached thereto. The operation of the floats 40 and 60 is substantially the same as that described for the float 10 in the metering container 11 except that floats 40 and 60 are restricted in their upward movement. This restriction has the advantage of allowing the container 41 to be tilted from a perpendicular axis without the floats 40 and 60 contacting the sides of the metering container 41. The hinge member 50 of the float 40 and the hinge members 64 and 65 of the float 60 assure that the diaphragms 48 and 67 will positively seat on the valve seats VS' and VS" when the falling level of solution reaches the valve seats VS' and VS", respectively.

Referring now to the embodiment of FIGURES 9 through 12 of the illustrative drawings, there is shown a connector generally indicated at 75 which is shown to take the form of a connector cap 76. The connector cap 76 is shown to have an internally threaded side wall 77 which joins an end wall 78. The end wall 78 is shown to have an aperture 79. The connector cap 76 is shown to include a liner 80. The liner 80 is shown to have an upstanding annular bead 81 which is shown to abut a terminal end 82 of an externally threaded tubular neck 83 of a typical rigid glass parenteral solution container generally indicated at 84. The container 84 is like the container 17 shown in FIGURE 1 of the illustrative drawings. Since the liner 80 is composed of a somewhat resilient material, threading the connector cap 76 onto the externally threaded tubular neck 83 serves to compress the bead 81 to establish a fluid-tight seal between the bead 81 and the terminal end 82 of the tubular neck 83. The liner 80 has formed integrally therewith an air vent 85 which projects through the aperture 79. The air vent 85 has an inwardly extending continuous annular flange 86 which is rounded to define a valve seat 87. A ball 88 rests against the valve seat 87 until air enters the air vent 85 and lifts the ball 88 from the valve seat 87 as shown in FIGURE 10 of the illustrative drawings. A plurality of inwardly extending projections 87a prevent the ball 88 from escaping from within the air vent 85. Frictionally received by the air vent 85 is an air filter assembly generally indicated at 89 which is shown to have an air filter disk 90 which is impervious to liquid, dust and bacteria but pervious to air.

The cap 76 has formed integrally therewith a downwardly depending continuous annular projection 91 and a downwardly extending rather short continuous annular projection 92 spaced therefrom. A drop chamber 93, preferably composed of a solvent-sealable flexible, resilient material, is preferably solvent sealed to and between both the projections 91 and 92. The connector cap 76 also has formed integrally therewith a downwardly extending projection 94, an end 95 of which defines a drop former. The tubular projection 94 defines an outlet passage 96. Formed integrally with the end wall 78 of the cap 76 is an upstanding projection 97 which is received through an aperture 98 in the liner 80. A length of tubing 93a is connected at one end to the drip chamber 93 and at the other end to a hypodermic needle 93b.

Referring now in particular to the invention illustrated in FIGURES 9 through 12 of the illustrative drawings, there is shown a valve assembly generally indicated at 99. The valve assembly 99 is shown to include an open-ended upstanding passage portion 100 which defines a passage 101. The passage portion 100 is shown to be in communication with the outlet passage 96 and is frictionally received in fluid-tight engagement therein. The lower end of the passage portion 100 is tapered as indicated at 102 to facilitate the insertion of the passage portion 100 into the outlet passage 96. The passage portion 100 is shown to include a vertically extending tubular section 103 and another vertically extending tubular section 104 offset therefrom which are integrally joined by a transition section 105. Formed integrally with the vertical section 104 is a baffle or platform P. The baffle or platform P includes a horizontally and outwardly extending supporting arm 107 having at its marginal end an upstanding post 108. The purpose of the baffle or platform P is to partially support the diaphragm 110 at its side edge, should the container 84 ever become canted with respect to the vertical at the time the diaphragm 110 is ready to seat against the valve seat 106. Canting of the container 84 would tend to cant the float 109. The platform P also serves as a baffle so that air bubbles which pass into the neck 85 will rise to the surface of the liquid and will not "short circuit" and pass from the air vent 85 into the passage 101.

A one-piece float generally indicated at 109 is shown to include a very thin, flexible diaphragm 110 with a form retaining member 111 joined at a marginal edge thereof. The diaphragm 110 is shown to have a greater effective transverse extent $tc$ than the transverse extent $tc'$ of the valve seat 106. The float 109 also includes a hinge member 112 which is joined at one end to the very thin, flexible diaphragm 110 and at the other end to a retaining member 113 having an aperture 114 which receives the post 108. As shown in FIGURE 10 of the illustrative drawings, the solution in the container 84 buoys up the float 109 to an extent that the very thin, flexible diaphragm 110 is not seated against the valve seat 106. When the level of the solution falls to about the level of the valve seat 106 as indicated in FIGURE 11 of the illustrative drawings, the very thin, flexible diaphragm 110 at least partially conforms to the valve seat 106 forming an effective continuous seal, whereby no air and no additional solution are able to pass through the outlet passage 96.

In the embodiment of FIGURES 13 and 14 of the illustrative drawings like components to those of the embodiment of FIGURES 9 through 12 of the illustrative drawings are designated by like reference characters with the addition of a prime symbol. A valve assembly generally indicated at 115 is shown to include an upstanding open-ended passage portion 116, a lower marginal end 117 of which is frictionally received in fluid-tight engagement in an outlet passage 96'. The passage portion 116 defines a passage 118 which opens directly into the outlet passage 96'. The upper end of the passage portion 116 is shown to have a valve seat 119 which is preferably annular as shown. Formed integrally with the passage portion 116 is a baffle or platform P' having the same function as the baffle or platform P. The baffle or platform P' includes an upwardly and transversely outwardly extending supporting arm generally indicated at 120 which includes a web 120'. The supporting arm 120 has a post 121, disposed transversely outwardly of the valve seat 119, which is shown to extend in an upward direction. A float generally indicated at 122 is shown to have a very thin, flexible diaphragm 123. The diaphragm 123 is shown to have a greater effective transverse extent $td$ than the transverse extent $td'$ of valve seat 119. A form retaining member 124 is shown to be formed integrally with the marginal edge of the very thin, flexible diaphragm 123. Although the very thin, flexible diaphragm 123 and the form retaining member 124 are each shown to be annular, other shapes suitable for accomplishing the purposes of the invention are employable. A thin, flexible hinge member 125 is shown to be joined at one marginal edge of the very thin, flexible diaphragm 123 and at the other end to a retaining member 126. The retaining member 126 has an aperture 127 which is shown to frictionally receive the post 121 of the supporting arm 120. FIGURES 13 and 14 show the very thin, flexible diaphragm 123 partially conforming to the rounded valve seat 119 whereby flow of the parenteral solution from the container 84' through the passages 118 and 96' is sealed off. It is apparent that until the liquid level in the container 84' falls to about the level of the valve seat 119, the very thin, flexible diaphragm 123 with its form retaining member 124 continues to float in the parenteral solution and is prevented from floating on the surface of the parenteral solution by the anchored hinge 112 in the same manner as illustrated in FIGURE 10 of the illustrative drawings.

The container 84', which is shown to be a typical transparent rigid glass solution container, has a body portion 84$a$ of relatively large internal diameter which opens into the tubular neck 83' having a relatively small internal diameter. Since the float 122 and the valve seat 119 are disposed in the large inside diameter body portion, the total transverse extent $td''$ of the float 122 which is anchored thereto is able to be larger than the internal diameter of the tubular neck 83' as shown. This enables the diaphragm 123 to have a relatively large overall transverse extent.

Referring now to FIGURES 15 and 16 of the illustrative drawings, there is shown a one-piece float generally indicated at 130 which is like floats 40, 60, 109 and 122, but the float 130 does not have a form retaining member. Although a very thin, flexible diaphragm 131 of the float 130 does not have a form retaining member, it has sufficient form retainability to conform partially to a valve seat 131 and establish a continuous seal with a valve seat 132. The float indicated at 130 is shown to have a thin, flexible hinge 133 and a retaining member 134 having an aperture 135. The diaphragm 131 is shown to have a substantially greater transverse extent $te$ than the transverse extent $te'$ of the valve seat 132.

FIGURE 17 illustrates a very thin, flexible diaphragm 136 which is too thin and has no form retaining member and hence has insufficient form retainability to establish an effective continuous seal with the valve seat 137. For example, a very thin, flexible diaphragm without a form retaining member and without sufficient form retainability will warp as it attempts to conform to the valve seat, thereby forming capillary-like openings at one or more locations between the very thin, flexible diaphragm 136 and the valve seat 137 as indicated at O, thereby incompletely interrupting the flow of solution and air. A form retaining member eliminates this effect. This effect also results when the transverse dimension of a very thin, flexible diaphragm is too small relative to the transverse extent of the valve seat and when at the same time no adequate form retaining member is provided. Conversely, constructing the very thin, flexible diaphragm of relatively great transverse extent with respect to the valve seat eliminates distortion or random warpage without the employment of a form retaining member. The term "form retainability" is intended to designate a diaphragm of a float which is able to form an effective continuous seal with the valve seat due to the fact that the very thin, flexible diaphragm does not warp at random or become distorted with the consequent formation of capillary-like openings between the diaphragm and the valve seat. Although the provision of a form retaining member is preferred it is apparent that it can be omitted from the floats 10, 40, 60, 109 and 122 so long as the diaphragm has sufficient form retainability to establish an effective continuous seal.

It is to be understood that constructing the connector 75 integrally with the passage portion 100 and likewise constructing the connector 75' integrally with the passage portion 116 is within the purview of the invention.

While the float has been described for use in the administration of parenteral solutions, it should be understood that this invention also is meant to include the use of the float in other types of apparatus and for conveying various types of liquids. Thus, for example, it is within the scope of the present invention to use the float in a container having its top open to the atmosphere wherein the container is filled with any type of liquid.

In addition, it should be understood that other forms for retaining the diaphragm are employable other than an annular form retaining member as for example, an oval, a square or a rectangular retaining form. It is obvious that the diaphragm 48 and its form retaining member 49, the diaphragm 67 and its form retaining member 66, the diaphragm 110 and its form retaining member 111, the diaphragm 123 and its form retaining member 124, and the diaphragm 131 are required to be sufficiently floatable or buoyant to float in the solution out of contact with their respective valve seats and are normally restrained from floating on the surface of the solution by their respective hinge members when the level of the solution in the container is above the respective valve seat, while the diaphragm 31 and its form retaining member 32 are simply required to be sufficiently buoyant to float on the surface of the solution. One manner of rendering the various diaphragms and their respective form retaining members floatable is to construct each float 10, 40, 60, 109, 122 and 130 of a material having a lesser weight per unit volume than the same unit volume of the parenteral solution with which it is to be used. Although the floats 40, 60, 109, 122 and 130 are normally submerged below the surface of the solution, it is not outside the scope of the invention to construct and mount these floats so that the diaphragm 48 and its form retaining member 49, the diaphragm 67 and its form retaining member 66, the diaphragm 110 and its form retaining member 111, the diaphragm 123 and its form retaining member, and the diaphragm 131 float on the surface of the solution when the solution level falls to slightly above the respective valve seat. The preferred material of constructing the floats 10, 40, 60, 109, 122 and 130 is natural rubber. It is to be understood, however, that rubber-like plastic materials, polyethylene, or the like are employable as substitutes.

The above-described embodiment being exemplary only, it will be understood that modifications in form or detail can be made without departing from the spirit and scope of the invention. Accordingly, the invention is not to be considered as limited save as is consonant with the scope of the following claims.

What is claimed is:

1. In an apparatus for administering a parenteral solution to a patient, a container having a lower end wall and an upper end enclosed by a cap member in which an air vent is formed, a generally cylindrical side wall, and an inlet tube means with one end adapted to communicate with a source of parenteral solution and the other communicating with the interior of said container, a tubing clamp mounted on said inlet tube means, said container having said lower end wall provided with at least one axially disposed reducing section, a drip chamber having the upper end thereof sealably mounted on one said reducing section, a reduced diameter generally axial tubular outlet passage disposed in the lower end wall of said container and extending a short distance inwardly above said end wall and extending outwardly therefrom with the outer end projecting into the interior of the said drip chamber, said drip chamber having at the lower end thereof a tubular outlet means with clamp means mounted thereon to regulate the flow of solution therethrough, a float located in said container and comprised of a thin, flexible, annular diaphragm independently and floatably supportable within said container by the parenteral solution therein when parenteral solution is contained in said container, said float being maintained in axial alignment with said tubular outlet passage by means of said solution and adapted to form sealing engagement with said tubular outlet passage when the liquid level within the container falls to the upper end of the said tubular outlet passage.

2. In an apparatus for administering a parenteral solution to a patient, a container having a lower end wall and an upper end enclosed by a cap member in which an air vent is formed, a generally cylindrical side wall, and an inlet tube means with one end adapted to communicate with a source of parenteral solution and the other communicating with the interior of said container; a tubing clamp mounted on said inlet tube means, said container having said lower end wall provided with at least one axially disposed reducing section, a drip chamber having the upper end thereof sealably mounted on one said reducing section, a reduced diameter generally axial tubular outlet passage disposed in the lower end wall of said container and extending a short distance inwardly above said end wall and extending outwardly therefrom with the outer end projecting into the interior of the said drip chamber, said drip chamber having at the lower end thereof a tubular outlet means with clamp means mounted thereon to regulate the flow of solution therethrough, a float located in said container and consisting of a thin, flexible, annular diaphragm independently and floatably supportable within said container by the parenteral solution therein when parenteral solution is contained in said container, means mounted in said container proximate said lower end wall for limiting the vertical movement of said diaphragm whereby said diaphragm is maintained in proximity to the upper end of said tubular outlet passage, said float being maintained in axial alignment with said tubular outlet passage by means of said solution and adapted to form sealing engagement with said tubular outlet passage when the liquid level within the container falls to the upper end of the said tubular outlet passage.

3. In an apparatus for administering a parenteral solution to a patient, a container having a lower end wall and an upper end enclosed by a cap member in which an air vent is formed, a generally cylindrical side wall, and an inlet tube means with one end communicating with a source of a parenteral solution and the other communicating with the interior of said container; a tubing clamp mounted on said inlet tube means between said cap member and the source of the solution, said container having said lower end wall provided with at least one axially disposed reducing section, a drip chamber having the upper end thereof sealably mounted on one said reducing section, a reduced diameter generally axial tubular outlet passage disposed in the lower end wall of said container and extending a short distance inwardly above said end wall and extending outwardly therefrom with the outer end projecting into the interior of the said drip chamber, said drip chamber having at the lower end thereof a tubular outlet means with clamp means mounted thereon to regulate the flow of solution therethrough; a float comprised of a thin, flexible, annular diaphragm sealed at the marginal edge thereof to a form retaining member, said diaphragm being located within said container and being freely and floatably supportable within said container by the parenteral solution therein, said float being maintained in axial alignment with said tubular outlet passage by means of said solution and adapted to form sealing engagement with said tubular outlet passage when the liquid level within the container falls to the upper end of the said tubular outlet passage.

4. In an apparatus for administering a parenteral solution to a patient, a container having a lower end closure and an upper end enclosed by a cap member in which an air vent is formed and a generally cylindrical side wall and inlet tube means with one end adapted to communicate with a source of a parenteral solution and the other communicating with the interior of said container, a tubing clamp mounted on said inlet tube means, said container having said lower end closure provided with at least one axially disposed reducing section, a drip chamber having the upper end thereof sealably mounted on one said reducing section, a reduced diameter generally axial, tubular outlet passage disposed in the lower end closure of said container and extending a short distance inwardly above said end closure and extending outwardly therefrom with the outer end projecting into the interior of the said drip chamber, said drip chamber having at the lower end thereof a tubular outlet means with clamp means mounted thereon to regulate the flow of solution therethrough, and a float comprised of a very thin, flexible diaphragm sealed at the marginal edge thereof to a form retaining member, and at least one thin, flexible hinge member joined at one end thereof to said diaphragm and being anchored at the other end thereof in said container in proximity to said tubular outlet passage, said diaphragm with said form retaining member being sufficiently buoyant to float in the solution out of contact with said outlet passage but being normally restrained from floating on the surface of the solution by said hinge member when the level of the solution in said container is above said outlet passage, said diaphragm being sufficiently flexible to conform at least partially to said outlet passage to seal off flow therethrough when the level of the solution in said container falls to said outlet passage.

5. Apparatus as set forth in claim 4 including means mounted on said float to substantially increase the buoyancy thereof.

6. Apparatus as set forth in claim 4 including a thin plastic disc sealingly mounted to said form retaining member and spaced from said diaphragm so as to define an air cell between said disc and diaphragm whereby the buoyancy of said float is substantially increased.

7. Apparatus as set forth in claim 4 including a plastic foam disc secured to said float to substantially increase the buoyancy thereof.

References Cited by the Examiner

UNITED STATES PATENTS

| | | | |
|---|---|---|---|
| 194,676 | 8/77 | Hansen | 137—451 X |
| 962,660 | 6/10 | Nolen | 137—448 |
| 2,272,304 | 2/42 | Lohman et al. | 137—433 |
| 2,642,867 | 6/53 | Livingston | 128—214 |
| 2,757,670 | 8/56 | Ogle | 128—214 |
| 2,836,179 | 5/58 | Ryan | 128—214 |
| 2,850,211 | 9/58 | Fernandez | 128—214 X |
| 3,035,575 | 5/62 | Broman | 128—214 |
| 3,067,879 | 12/62 | Baker | 137—398 X |

RICHARD A. GAUDET, *Primary Examiner.*